United States Patent [19]

Nyman et al.

[11] 4,262,875

[45] Apr. 21, 1981

[54] INFORMATION RECORD STAMPERS

[75] Inventors: Frederick R. Nyman, Carmel; Thomas E. Smith, Indianapolis, both of Ind.

[73] Assignee: RCA Corporation, New York, N.Y.

[21] Appl. No.: 67,306

[22] Filed: Aug. 17, 1979

[51] Int. Cl.³ .................. B29C 1/04; B29D 17/00
[52] U.S. Cl. .................. 249/114 R; 249/103; 249/140; 425/403; 425/810; 204/192 C; 427/250
[58] Field of Search .............. 204/5, 192 C; 427/250; 425/385, 403, 407, 810; 264/106, 107; 249/103, 114, 140

[56] References Cited

U.S. PATENT DOCUMENTS

| | | | |
|---|---|---|---|
| 713,863 | 11/1902 | Edison | 204/192 C |
| 1,954,950 | 4/1934 | Russell | 204/298 |
| 2,758,961 | 8/1956 | Kosowsky | 204/5 |
| 3,480,483 | 11/1969 | Wilkinson | 204/192 C X |
| 3,842,194 | 10/1974 | Clemens | 178/6.6 A |
| 3,842,217 | 10/1974 | Clemens | 179/100.4 C |
| 3,904,488 | 9/1975 | Nosker et al. | 204/5 |
| 4,044,379 | 8/1977 | Halter | 358/128 |
| 4,060,831 | 11/1977 | Halter | 358/128 |
| 4,131,530 | 12/1978 | Blum et al. | 204/192 C |

OTHER PUBLICATIONS

K. J. Stagg, The Development of Electroforming, *Product Finishing*, Sep. 1978, p. 27.

*Handbook of Thin Film Technology*, L. I. Maissel and R. Glang, Editors; McGraw-Hill Book Co., New York, 1970, pp. 3–8.

*Primary Examiner*—Delbert E. Gantz
*Assistant Examiner*—William Leader
*Attorney, Agent, or Firm*—B. E. Morris; E. J. Sites

[57] ABSTRACT

Video disc nickel stampers are coated with a very thin, e.g., 100–250 angstroms, non-grainy layer of chromium which imparts increased scratch resistance to carbon-filled polyvinylchloride resins during compression molding.

5 Claims, No Drawings

INFORMATION RECORD STAMPERS

This invention relates to an information record stamper having improved scratch resistance.

BACKGROUND OF THE INVENTION

Sound recordings are made by converting sound vibrations into surface deformities in a soft surface, such as a layer of lacquer on a metal disc. These deformities are then replicated in metal, as by metal plating of the lacquered surface, to form a stamping master from which a plurality of plastic reproductions can be made.

A capacitive method of recording and playback of video as well as sound information has recently been disclosed by Clemens in U.S. Pat. No. 3,824,194. According to the method described in the patent, an aluminum blank is coated with lacquer and a spiral groove cut into the lacquer. A silver layer is then chemically deposited on the lacquer and replicated to form a recording master. Audio, video and color information is recorded in the groove using a scanning electron microscope which modulates the groove with the information to be recorded. When the electron beam resist is developed, the information is in the form of a surface relief pattern in the groove.

A metal replica is then made from the developed recording master. One known method is to apply a layer of silverplate onto the soft surface followed by a low stress sulfamate nickel layer as a backing layer, or, an electroless nickel layer can be applied followed by a nickel plate layer. Another method is described by Nosker and Fox in U.S. Pat. No. 3,904,488. The original recording and the metal replicas are separated and the metal replica is then used to compression mold or stamp a plurality of plastic disc replicas.

Several changes in the basic recording system have since been made. Presently, the information is initially recorded in a metal master by electromechanical means, as is described in patents to Halter, inter alia, U.S. Pat. Nos. 4,044,379 and 4,060,831. The initial metal recording can be readily duplicated by electroplating, as with nickel, to form a fairly thick (17.5 mils or 444.5 microns) master. A mold is then made from the master by electrolessly plating a thin layer (½ mil or 12.7 microns) of nickel on the surface followed by electroplating a nickel backing layer. This produces a positive replica of the intial recording. A metal stamper is then made from the mold by electrolessly plating a ½ mil (12.7 microns) thick nickel layer followed by electroplating a 7 mil (177.8 microns) thick nickel backing layer. This negative image stamper is then used for compression molding to produce the plastic replicas.

The original video disc disclosed by Clemens comprised a plastic disc coated with a thin coating of metal and a thin dielectric layer. More recently a video disc has been developed which contains conductive carbon particles dispersed in the molding composition. The carbon particles are submicron sized, irregularly shaped particles present in the molding composition in fairly high amounts, e.g., from about 12–35 percent by weight of the molding composition. This comparatively high loading of abrasive particles has caused wearing of the nickel molding stampers in the form of a plurality of tiny permanent scratches. Other abrasive particles may be present as impurities in the vinyl resin, additives and the like. As the conductive molding composition is compression molded, the material is squeezed from the center outwardly in the mold and the abrasive carbon and any other hard particles in the molding composition can scratch the surface of the stamper as the material flows across the stamper face during molding. As succeeding discs are molded, the stamper face becomes increasingly scratched, which scratches are replicated in succeeding discs, resulting in unwanted dropouts and other electronic defects during playback of the disc. Although hundreds and even thousands of discs can be made from a single stamper using conventional PVC molding compositions in the record industry, using the carbon loaded composition the stampers become unuseable after only 100 or 200 replicas have been molded. Commercial operation requires that 800 to 1200 disc replicas be able to be made from a single stamper. Since only a limited number of metal stampers can be made from a single original recording, it would of course be highly desirable to increase the life of the metal stampers and increase the number of high quality disc replicas that can be made from each stamper.

SUMMARY OF THE INVENTION

We have found that nickel metal stampers containing information in the form of a surface relief pattern to be replicated into a molding composition can be coated with a thin film of a chromium-containing layer that resists scratching of the surface, particularly by minute abrasive particles.

DETAILED DESCRIPTION OF THE INVENTION

Conventional nickel plated video disc stampers are coated with a thin layer of chromium or an alloy of chromium. A suitable chromium alloy contains about 20 percent by weight of iron and about 2 percent by weight of titanium, but others are effective. It is believed a thin layer of chromium oxide forms at the surface of the coated stampers upon exposure to the atmosphere, and that it is the chromium oxide layer that produces the desired improved hardness characteristics. Generally the oxide layer formed will be about 20–50 angstroms thick.

The chromium-containing layer should preferably be about 100–220 angstroms thick, although thinner or thicker layers can be used. If the layer is too thin, the benefits of the layer may not be realized. If the layer is too thick, it could tend to fill up the grooves of the video disc or distort the submicron sized information pattern on the surface of the disc.

The chromium-containing layer can be applied using any conventional vapor deposition method, e.g., evaporation, d.c. sputtering, r.f. sputtering and the like, that will apply a thin, stress-free, conformal layer containing chromium. What is important is that the chromium-containing film be applied slowly, preferably at a rate less than about 10 angstroms per second, to reduce the graininess of the surface of the metal to a minimum, thereby avoiding distortion of the very small dimensioned surface topography.

Attempts to electroplate a chromium layer onto the stampers has been unsuccessful because plating is difficult to initiate on the passivated mold surface, and because it is very difficult to get a chromium layer that is thin enough by electroplating. Also, plated chromium films are rough, which distorts the very small signal elements as plating proceeds.

The nickel stampers coated with a chromium-containing film according to the invention can be employed to make hundreds of video disc replicas using a carbon filled polyvinylchloride resin. Because of the thinness and nongraininess of chromium films prepared herein, no degradation of either audio or video signals is encountered on playback of the disc replicas, and the present stampers have greatly improved scratch resistance.

The invention will be further illustrated by the following Example but is not meant to be limited to the details described therein. In the Example, parts and percentages are by weight.

EXAMPLE

A molding composition was prepared by admixing the following: 75.15 parts of a polyvinylchloride homopolymer available from the B. F. Goodrich Company which has a weight average molecular weight of 84,400, a number average molecular weight of 38,140 and a $T_g$ of 88°; 14.8 parts of carbon black, Ketjenblack EC, a product of the Akzo Chemie Co., Nederland, which has an apparent bulk density of about 140–160 grams per liter and an average primary particle size of about 300 angstroms; 1.5 parts of a tin stabilizer dibutyltin-$\beta$-mercaptopropionate, commercially available as T-35 from M & T Chemical Company, Inc.; 1.0 part of a tin stabilizer dibutyltin maleate, commercially available as Mark 275 from Argus Chemical Company; 0.75 part of a lubricant commercially available as Loxiol G-30 from Henkel International GmbH, a monofatty acid ester of varying molecular weight alcohols and acids; 0.25 part of a polyfunctional complex ester of saturated fatty acids lubricant commercially available as Loxiol G-70, also available from Henkel; 0.5 part of calcium stearate lubricant; 0.3 part of a low molecular weight paraffin oil lubricant commercially available as Olio di Vasilina from Carlo ERBA, a division of Chemica Industrialle, Milan; 0.75 part of a modifier Acryloid K-175, and 2.0 parts of a processing aid Acryloid K-147, polymethylmethacrylate resins commercially available from Rohm & Haas Company; and 3.0 parts of a modifier, Santicizer 711 from Monsanto Company, which is a primary phthlate-type plasticizer. A method of mixing the above molding composition is disclosed by Martin in copending application Ser. No. 041,747, filed May 23, 1979. Other suitable molding compositions for the video disc are disclosed by Martin et al. in copening application Ser. No. 003,363, filed Jan. 15, 1979.

One lot of discs of the above molding composition (lot A) were compression molded using a conventional nickel stamper and a second lot of discs (lot B) was molded using a video disc stamper coated as follows:

An electroformed nickel stamper was placed in a vacuum chamber fitted with a conventional planar magnetron dc sputtering apparatus. The vacuum chamber was evacuated to about $4 \times 10^{-6}$ torr and argon gas added to a pressure of about $4 \times 10^{-4}$ torr. Sputtering of a chromium alloy containing 78 percent of chromium, 20 percent of iron and 2 percent of titanium was initiated. The rate of deposition was about 4 angstroms per second, as measured using a conventional quartz crystal film thickness monitor. The thickness indicated by the monitor was verified using known ellipsometry techniques. Sputtering was continued until a layer about 185 angstroms thick had been applied.

Several sample discs from each run were played back at the outside edge and at the inside of each disc on both sides. The number of dropouts on both sides of the disc (1 and 2) were counted. The data are summarized below in Table I. Ten dropouts or less in each region is considered satisfactory.

TABLE I

| Lot # | Disc # | Side 1 Outside | Side 1 Inside | Side 2 Outside | Side 2 Inside |
|---|---|---|---|---|---|
| A | 15 | <10 | <10 | <10 | <10 |
|   | 119 | 25 | 50 | <25 | 25 |
|   | 235 | 50 | 100 | <50 | 75 |
|   | 412 | <100 | <100 | <100 | <100 |
| B | 9 | <10 | <10 | <10 | <10 |
|   | 211 | <10 | <10 | <10 | <10 |

It is apparent that the chromium coated stamper produced fewer dropouts as molding proceeded than the conventional stamper.

The discs were also visually inspected at the outside and inside edges for evidence of scratches which were counted. The data are given below in Table II.

TABLE II

| Lot # | Disc # | Side 1 Outside | Side 1 Inside | Side 2 Outside | Side 2 Inside |
|---|---|---|---|---|---|
| A | 15 | 0 | 3 | 2 | 2 |
|   | 119 | 1 | 11 | 0 | 4 |
|   | 235 | 3 | 14 | 2 | 5 |
|   | 412 | 16 | 19 | 2 | 23 |
| B | 6 | — | 0 | — | 0 |
|   | 216 | — | 0 | — | 1 |

Again, the number of scratches was less for the chromium coated stamper discs than for those pressed from a conventional stamper.

After molding 400 discs from the chromium-coated stamper, very few compound scratches were noted and playback was free of short (1–5 microsecond) dropouts.

The audio signal to noise ratio of discs compression molded from the above stamper was measured in two places on the disc; at a radius of 5.47" (13.9 cm) from the center and at 3.22" (8.18 cm) from the center. An unmodulated test audio signal was recorded in these locations on the discs. The data was collected from a spectrum analyzer and signal lever, noise level and signal to noise ratio read directly from a present calculator. The results are an average of 2 readings from 2 test discs.

The results were 24.4 and 23.4 respectively. Discs of the same material pressed from a conventional stamper gave results of 23.9 and 23.7 respectively. Thus the stampers of the invention do not degrade the signal to noise ratio of the recorded information.

What is claimed is:

1. A scratch resistant nickel stamper containing audio and video information in the form of a submicron size surface relief pattern on a surface thereof coated with an about 100–220 angstroms thick, vapor deposited, conformal, chromium containing layer.

2. A stamper according to claim 1 wherein the chromium-containing layer is vapor deposited from an alloy of chromium containing about 78 percent by weight of chromium, about 20 percent by weight of iron and about 2 percent by weight of titanium.

3. A stamper according to claims 1 wherein a layer of chromium oxide about 20 to 50 angstroms thick is present at the surface of the chromium-containing layer.

4. A stamper according to claim 1 wherein the surface relief pattern is contained in a spiral groove.

5. A stamper according to claim 2 wherein the chromium-containing layer is applied by sputtering.

* * * * *